United States Patent
Beitler et al.

(10) Patent No.: US 10,527,710 B2
(45) Date of Patent: *Jan. 7, 2020

(54) SYNCHRONIZATION IN SOFTWARE-DEFINED RADIO SYSTEMS

(71) Applicant: International Business Machines Corporation, Armonk, NY (US)

(72) Inventors: Anton Beitler, Küsnacht (CH); Alexandru Caracas, Thalwil (CH); Thomas Eirich, Waedenswil (CH); Michael Kuyper, Kaltbrunn (CH); Marcus Oestreicher, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/111,685

(22) Filed: Aug. 24, 2018

(65) Prior Publication Data

US 2019/0011524 A1 Jan. 10, 2019

Related U.S. Application Data

(63) Continuation of application No. 15/075,855, filed on Mar. 21, 2016, now Pat. No. 10,067,219.

(51) Int. Cl.
*G01S 5/04* (2006.01)
*H04W 56/00* (2009.01)
(Continued)

(52) U.S. Cl.
CPC .......... *G01S 5/04* (2013.01); *G01S 5/06* (2013.01); *H04W 56/00* (2013.01); *H04W 56/006* (2013.01); *H04W 64/00* (2013.01)

(58) Field of Classification Search
CPC .... G01S 5/14; G01S 5/04; G01S 5/06; H04W 64/00; H04W 56/00; H04W 56/004; H04W 56/0055; H04W 56/006
See application file for complete search history.

(56) References Cited

U.S. PATENT DOCUMENTS 9,008,587 B2  4/2015  Carbajal
9,065,699 B2  6/2015  Stratigos, Jr.
(Continued)

OTHER PUBLICATIONS

List of IBM Patents or Patent Applications Treated as Related.

*Primary Examiner* — Min Jung
(74) *Attorney, Agent, or Firm* — Scully, Scott, Murphy & Presser, P.C.; Daniel Morris, Esq.

(57) ABSTRACT

A software-defined radio system has a plurality of fixed radio receivers each operable to receive radio signals in a receiving band, to sample a received radio signal to produce a sample stream, and to send the sample stream over a network. The radio system includes at least one fixed sync signal transmitter operable to transmit predetermined sync signals in said receiving band to receivers of the aforementioned plurality. The radio system further comprises a data processing system which is connected to the network for receiving sample streams from the receivers. The data processing system is operable to align samples of a data signal contained in sample streams from different receivers by: detecting a sync signal in those sample streams; determining a timing offset between samples of the sync signal in those sample streams in dependence on predetermined locations of the different receivers and the transmitter of that sync signal; and aligning the samples of the data signal in dependence on the timing offset.

14 Claims, 4 Drawing Sheets

(51) Int. Cl.
*H04W 64/00* (2009.01)
*G01S 5/06* (2006.01)

(56) References Cited

U.S. PATENT DOCUMENTS

| | | | |
|---|---|---|---|
| 9,648,464 B1* | 5/2017 | Tran | H04W 4/029 |
| 2013/0023285 A1 | 1/2013 | Markhovsky et al. | |
| 2013/0024155 A1* | 1/2013 | Le | G01S 5/021 |
| | | | 702/150 |
| 2014/0211779 A1 | 7/2014 | Caire et al. | |
| 2015/0146712 A1 | 5/2015 | Jim | |
| 2017/0223653 A1 | 8/2017 | Weitnauer et al. | |

* cited by examiner

SYNCHRONIZATION IN SOFTWARE-DEFINED RADIO SYSTEMS

BACKGROUND

The present disclosure relates generally to synchronization in software-defined radio systems, and more specifically to alignment of data signal samples in sample streams from radio receivers of such systems.

Software-defined radio (SDR) systems are radio communications systems in which various functions that are usually implemented in hardware in radio systems can instead be performed by software in some form of data processing system connected to the radio receivers. Radio signals can be analysed and demodulated entirely in software running on general purpose processors, without the need for specialized decoding radio hardware. This allows for higher flexibility with respect to new communication protocols and lower complexity in the radio front-end infrastructure. Software defined radio is already in use in many communication applications to speed-up technology development and to allow for adaptable system designs. A typical SDR system, such as a C-RAN (Cloud Radio Access Network) system may include a distributed array of fixed radio receivers connected via a network to a centralized data processing system such as a cloud computing system. The radio receiver (or "radio head") units can receive data signals transmitted in their receiving band by devices in their neighborhood, and generally also transmit to such devices. The front-end receiver hardware converts received radio signals to digital sample streams which are sent via the network to the back-end processing. Signal processing tasks such as modulation/demodulation, signal detection, encryption/decryption, etc., can be efficiently performed by SDR processing resources in the back-end, allowing simplification of front-end receivers.

Current SDR architectures require precise time synchronization at the radio receivers and dedicated network links with transport time information for transporting signals to the back-end processing. The receiver clocks are synchronized, e.g. using GPS (Global Positioning System) hardware, for alignment, or synchronization, of samples in the sample streams from different receivers. The timing information provided by specialized transport-network hardware allows synchronization between receivers and SDR processing in the back-end. As well as signal alignment, this clock synchronization is required for processes such as device localization in which geographical location of a data transmitter is determined from the time-difference-of-arrival (TDOA) of the data signal at known receiver locations.

SUMMARY

According to at least one embodiment of the present invention there is provided a software-defined radio system having a plurality of fixed radio receivers each operable to receive radio signals in a receiving band, to sample a received radio signal to produce a sample stream, and to send the sample stream over a network. The radio system includes at least one fixed sync signal transmitter operable to transmit predetermined sync signals in said receiving band to receivers of the aforementioned plurality. The radio system further comprises a data processing system which is connected to the network for receiving sample streams from the receivers. The data processing system is operable to align samples of a data signal contained in sample streams from different receivers by: detecting a sync signal in those sample streams; determining a timing offset between samples of the sync signal in those sample streams in dependence on predetermined locations of the different receivers and the transmitter of that sync signal; and aligning the samples of the data signal in dependence on the timing offset.

At least one further embodiment of the present invention provides a method for processing samples of a data signal contained in sample streams from different radio receivers at a data processing system of such a software-defined radio system. One or more further embodiments provides a computer program product comprising a computer readable storage medium embodying program instructions for causing a data processing system to execute such a method.

Embodiments of the invention will be described in more detail below, by way of illustrative and non-limiting example, with reference to the accompanying drawings.

DETAILED DESCRIPTION

Figure 1:
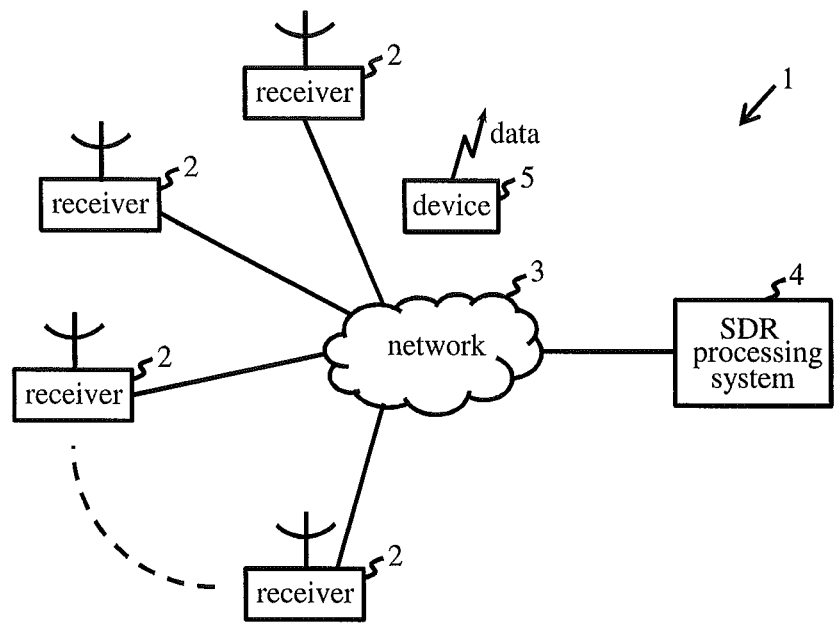
FIG. 1 is a schematic representation of a software-defined radio system embodying the invention.

The present disclosure provides may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 is a schematic illustration of an exemplary SDR system 1 embodying the invention. The SDR system 1 includes a plurality of RF (radio frequency) receivers 2 providing a receiver array for receiving radio signals in a receiving band of the array. The radio receivers 2 are fixed, i.e. at stationary locations. The receiver locations are determined to a desired accuracy in system 1. In preferred embodiments the receiver locations are known to centimeter precision. The radio receivers 2 are connected via a network 3 to a data processing system 4 where radio signals can be processed by SDR software running on the processing system. Each of the receivers 2 is operable to receive radio signals transmitted in the receiving band by devices in their neighborhood, e.g. a mobile transmitter device indicated at 5 in the figure. Each receiver 2 samples a received radio signal to produce a stream of digital samples, and sends the sample stream to the SDR processing system 4 via the intervening transport network 3. SDR systems typically use I/Q (In-phase and Quadrature) modulation for signal communications. In this case, the sample stream from a receiver comprises a stream of I/Q samples representing the received analog signal. However, the particular modulation scheme employed in system 1 is orthogonal to the embodiments described. Data signals from transmitter devices 5 within range of the receiver array will thus be picked up by one or more receivers 2 and communicated to the back-end SDR processing system 4. The receiver units 2 can generally also transmit signals to devices 5 in their neighborhood, e.g. signals communicated via the SDR backend 4 from other mobile devices. The SDR system 1 may include a plurality of receiver arrays for servicing different neighborhoods, with a common processing system 4 providing the SDR back-end.

The SDR system 1 also includes at least one fixed sync (synchronization) signal transmitter operable to transmit predetermined sync signals in the receiving band to receivers 2 of the array. In some embodiments, a sync signal transmitter may be provided by a dedicated transmission device at a known location in the array neighborhood. In preferred embodiments, however, sync signal transmitter functionality is provided by one or more receivers 2 in SDR system 1. For example, a plurality of receivers 2 in a given array may include functionality for transmitting sync signals to other receivers of the array. In the preferred embodiment described below, each receiver 2 of an array includes such a sync signal transmitter.

Figure 2:
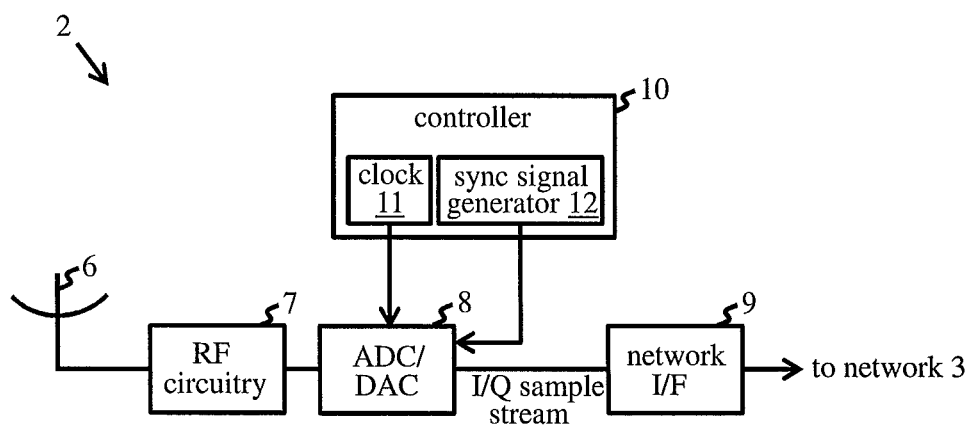
FIG. 2 is a block diagram showing components of a radio receiver in the SDR system of FIG. 1.

FIG. 2 is a schematic diagram of the receiver apparatus indicating the main functional blocks involved in operation of a receiver 2. Each receiver 2 includes an antenna 6 which is typically mounted on a tower with line-of-sight to antennas of other receivers in the array. RF block 7 comprises circuitry for performing standard RF signal processing, e.g. amplification, filtering, down-conversion, etc. The RF circuitry 7 is connected to ADC (analog-to-digital converter)/DAC (digital-to-analog converter) circuitry 8. ADC/DAC block 8 samples analog signals received from RF circuitry 7 to produce digital (here I/Q) sample streams to be relayed to the SDR back-end, and converts I/Q sample streams input for transmission into analog signals which are output to RF circuitry 7. ADC/DAC block 8 is connected to a network interface (I/F) 9 via which sample streams are sent and received over transport network 3. The receiver includes control circuitry, e.g. a microcontroller, 10 which controls operation of the receiver circuitry. Controller 10 provides a receiver clock 11 and supplies clock signals to ADC circuitry 8 for timing the sampling of received analog signals. Successive I/Q samples are thus equidistantly spaced in accordance with the sample frequency defined by receiver clock 11. Controller 10 also includes a sync signal generator 12 providing the functionality for generating sync signal samples which are supplied to the DAC circuitry 8 for transmission of a sync signal via antenna 6. Receiver components 7 to 12 can be implemented by circuitry of generally known form and suitable implementations will be apparent to those skilled in the art.

Sync signals transmitted by receivers 2 may comprise a series of pulses. The form of a sync signal is predetermined in system 1 to allow detection of sync signals by SDR processing system 4. Different receivers 2 may be adapted to transmit different sync signals, e.g. having different pulse shapes, and/or receivers 2 may be selectively operable to transmit sync signals in accordance with a predetermined schedule. For example, the receivers may implement a distributed selection process, taking turns as to which group sends sync signals according to a known schedule. Sync signals transmitted by any given receiver can be identified as such by SDR back-end 4 based on signal form and/or scheduling. All sync signals are emitted in the receiving band of the array so that they can be received by neighboring receivers. However, sync signals need not necessarily use the same modulation as that used for data transmission. Sync pulses may be shaped in such a way as to enhance detection and processing accuracy in the SDR back-end, e.g. to inhibit interference with data and/or to use the entire bandwidth available to the SDR system. Any clock drift between synchronization pulses at a receiver is either negligible for system operation or can be modelled in processing system 4 in known manner.

The devices 5 serviced by SDR system 1 may comprise any device capable of data transmission such as, for example, mobile radio units, mobile phones, laptop computers, tablet computers, palmtop devices, personal music players, etc. In general, a device 5 may be any transmitting device in an IoT ("Internet of Things" context). The particular protocol used for data communications is orthogonal to operation of system 1.

The transport network 3 may in general comprise one or more component networks and/or internetworks, and may include wired and/or wireless network links. In general, any form of network may be used for network 3 as appropriate in a given scenario. The nature of this network may depend on bandwidth required to accommodate data transmission rates in a given application. For high data rates, for instance, network 3 may comprise a high-speed optical fiber network. For low data rates, network 3 may comprise an Ethernet network for example. More generally, the front-haul (transport network) link capacity allocation can be scaled in accordance with the required wireless link bandwidth allowing selection from a range of commodity link technology, spanning from e.g. fiber optical to copper, as appropriate.

The back-end processing system 4 implements SDR processing of raw I/Q sample streams sent to and from receivers 2, performing operations such as signal detection and analysis, modulation/demodulation, coding/decoding, compression/decompression, encryption/decryption, etc., as appropriate. In addition, in embodiments of the invention, the SDR processing system 4 is adapted to perform data signal alignment and device location operations as described in detail below. In general, SDR processing system 4 may be implemented by one or more general- or special-purpose computers, each comprising one or more (real or virtual) machines, providing functionality for implementing operations described herein. System 4 may include a computer readable storage medium (which may comprise one or more component media) containing executable program instructions for causing one or more computers of the system to implement the functionality described.

To process a large amount of I/Q data in a timely, near real-time, manner in embodiments of the invention, processing system 4 may comprise a distributed computing system. Processing tasks may be distributed over multiple compute cores in such a system. For example, in preferred embodiments, the SDR processing system 4 may comprise a cloud computing system. A cloud computing environment provides convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. SDR processing system 4 may thus be implemented by one or more cloud computing nodes in such a cloud computing environment. This allows the cloud computing environment to offer infrastructure, platforms and/or software as services for which a cloud consumer does not need to maintain resources on a local computing system.

Figure 3:
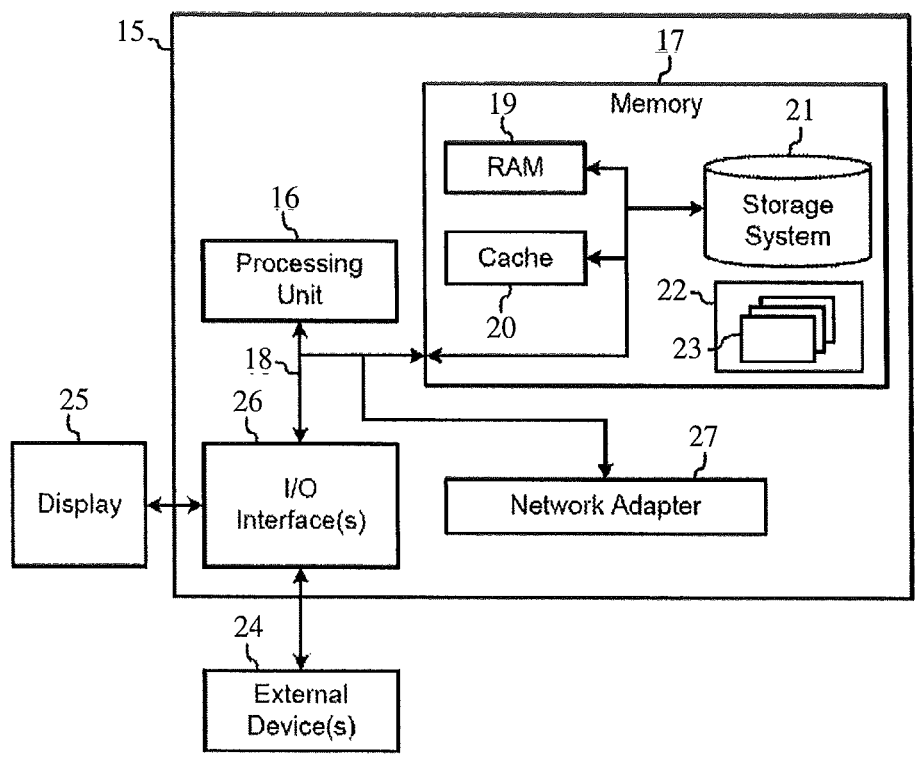
FIG. 3 is a generalized schematic of a computer in the data processing system of the FIG. 1 SDR system.

The block diagram of FIG. 3 shows an exemplary computing apparatus for implementing a computer of SDR processing system 4, e.g. in a cloud computing node. The computing apparatus may be described in the general context of computer system-executable instructions, such as program modules, being executed by a computer system.

Generally, program modules may include routines, programs, objects, components, logic, data structures, and so on that perform particular tasks or implement particular abstract data types. The computing apparatus may be practiced in distributed cloud computing environments where tasks are performed by remote processing devices that are linked through a communications network. In a distributed cloud computing environment, program modules may be located in both local and remote computer system storage media including memory storage devices. The computing apparatus is shown in FIG. 3 in the form of a general-purpose computer 15. The components of computer 15 may include processing apparatus such as one or more processors represented by processing unit 16, a system memory 17, and a bus 18 that couples various system components including system memory 17 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 15 typically includes a variety of computer readable media. Such media may be any available media that is accessible by computer 15 including volatile and non-volatile media, and removable and non-removable media. For example, system memory 17 can include computer readable media in the form of volatile memory, such as random access memory (RAM) 19 and/or cache memory 20. Computer 15 may further include other removable/non-removable, volatile/non-volatile computer system storage media. By way of example only, storage system 21 can be provided for reading from and writing to a non-removable, non-volatile magnetic medium (commonly called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can also be provided. In such instances, each can be connected to bus 18 by one or more data media interfaces.

Memory 17 may include at least one program product having one or more program modules that are configured to carry out functions of embodiments of the invention. By way of example, program/utility 22, having a set (at least one) of program modules 23, may be stored in memory 17, as well as an operating system, one or more application programs, other program modules, and program data. Each of the operating system, one or more application programs, other program modules, and program data, or some combination thereof, may include an implementation of a networking environment. Program modules 23 generally carry out the functions and/or methodologies of embodiments of the invention as described herein.

Computer 15 may also communicate with: one or more external devices 24 such as a keyboard, a pointing device, a display 25, etc.; one or more devices that enable a user to interact with computer 15; and/or any devices (e.g., network card, modem, etc.) that enable computer 15 to communicate with one or more other computing devices. Such communication can occur via Input/Output (I/O) interfaces 26. Also, computer 15 can communicate with one or more networks such as a local area network (LAN), a general wide area network (WAN), and/or a public network (e.g., the Internet) via network adapter 27. As depicted, network adapter 27 communicates with the other components of computer 15 via bus 18. It should be understood that although not shown, other hardware and/or software components could be used in conjunction with computer 15. Examples include, but are not limited to: microcode, device drivers, redundant processing units, external disk drive arrays, RAID systems, tape drives, and data archival storage systems, etc.

In embodiments of this invention, the receiver clocks 11 do not need to be synchronized with one another or with back-end processing system 4. Synchronization for alignment of data signals and device location can be performed entirely by processing in the back-end system. The alignment operation for data signals will be described with reference to FIGS. 4 and 5.

Figure 4:
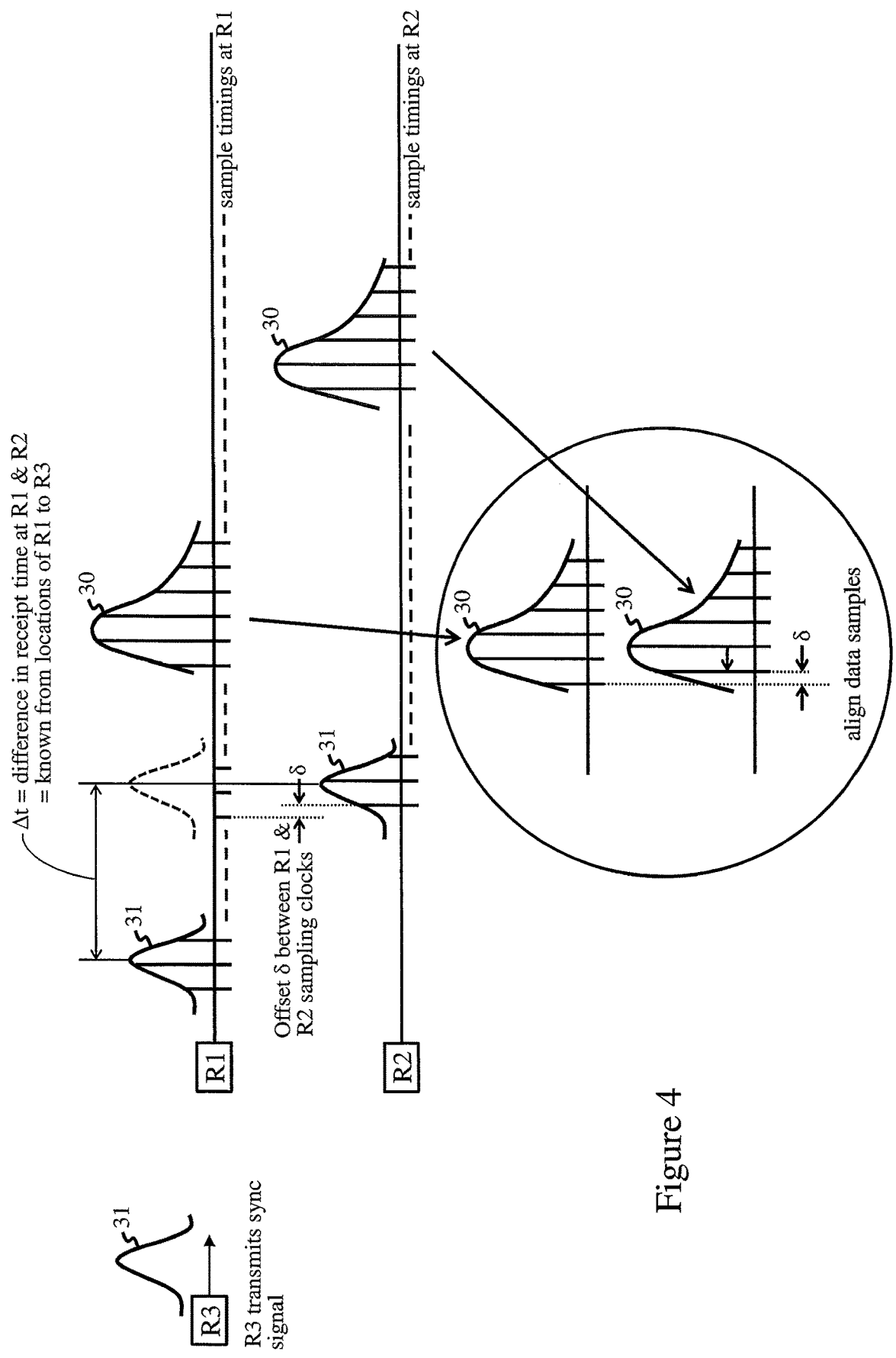
FIG. 4 is a schematic diagram indicating sample streams from different receivers of the FIG. 1 system.

FIG. 4 is a schematic diagram indicating sample streams from different receivers of the FIG. 1 system. Two receivers 2, denoted by R1 and R2, receive and sample a data signal, indicated schematically at 30, from a transmitting device 5 in their neighborhood. Each receiver R1, R2 also receives and samples a sync signal transmitted by another receiver 2, denoted here by R3. A sync pulse from R3 is indicated schematically at 31. Each receiver R1, R2 samples the received analog signals at respective sample timings as indicated schematically in the figure. The sample timings at each receiver are determined by that receiver's clock 11. Since the receiver clocks are unsynchronized, any timing offset between the two receiver clocks will result in a corresponding timing offset between sample timings at the two receivers. This offset must be determined in order to correctly align the samples of data signal 30 in the sample streams received from R1 and R2 by back-end processing system 4.

Figure 5:
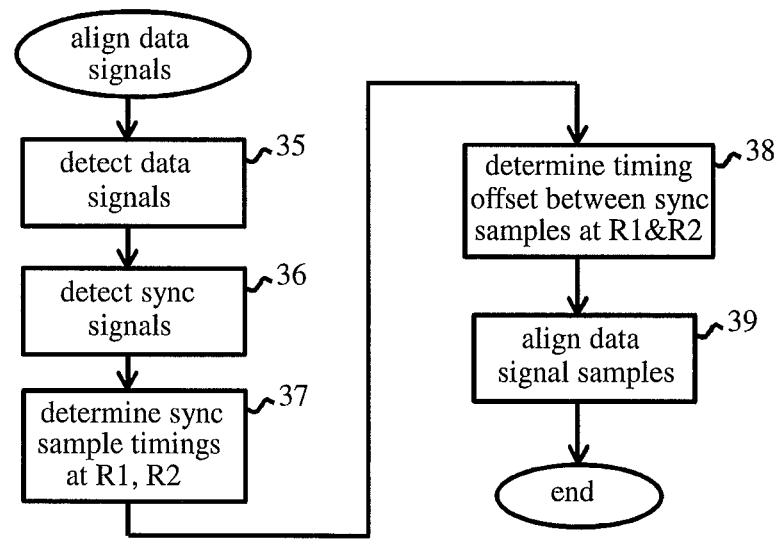
FIG. 5 indicates steps performed for alignment of data signals in the data processing system of the SDR system.

FIG. 5 indicates steps performed by processing system 4 for aligning samples of the data signal 30 contained in the sample streams from R1 and R2. Operation begins, as indicated at step 35, on detection at system 4 of a data signal from a transmitter device 5 in the sample streams from R1 and R2. Such a data signal can be detected in known manner, for example using the preamble, based on identifying data in the data sample stream such as header data identifying the transmitter device. In step 36, processing system 4 detects a sync signal in the two sample streams. The sync pulse 31 originating from R3 is thus detected based on the known pulse shape and/or sync transmission schedule as discussed above. In step 37, processing system 4 detects the sample timings at R1 and R2 relative to the known sync pulse waveform 31 as indicated in FIG. 4. In step 38, processing system 4 determines the timing offset δ between sync pulse samples in the two sample streams due to offset in the receiver clocks 11. In particular, the difference Δt in receipt time at R1 and R2 of the pulse 31 from R3 is determined in system 4 from the known locations of receivers R1 to R3. The timing offset δ between sync samples in the two streams can thus be determined as indicated in FIG. 4. This offset δ determines the timing offset between samples of data signal 30 in the two streams due to the unsynchronized receiver clocks. In step 39, the timing offset δ can thus be used to align samples of the data signal in the two streams as indicated in the inset of FIG. 4.

Note that, in general, sync pulses may be emitted at regular or irregular intervals, and need not be emitted very frequently. The alignment technique is also unaffected by communication delays for transferring streams of I/Q samples from the radio front-end to the SDR back-end. The only constraint here is that there should be no "gaps" (i.e. unrecoverable loss of samples) of unknown length in a sample stream between the data signal and sync pulse samples used for the alignment calculation. A suitable frequency of sync pulse transmission can be determined based on various factors, such as accuracy of receiver clocks, data transmission and anticipated loss rates, network link bandwidth, and desired accuracy in SDR operation. By way of illustration only, in a typical system with receiver clocks having a 10 ppm (parts-per-million) error, a sync pulse frequency of one pulse per second may be appropriate. In general, however, sync pulse frequency can be determined as appropriate for a given system to provide a desired degree of accuracy in the SDR processing operations.

The above system permits alignment of data streams from unsynchronized radio receivers to be performed entirely by computation in back-end processing system 4, independent of the time at the receivers. Radio receivers 2 can thus be significantly simplified, further relaxing the hardware requirements for the radio front-end of SDR systems as no additional means of synchronization (e.g. GPS) is required. The I/Q data streams originating from an array of RF receivers can be readily aligned in real-time, e.g. in a cloud-based SDR processing system. The functionality for sync signal transmission is easily incorporated in receiver units of preferred embodiments, whereby separate sync signal transmitters are not required and overall system hardware is minimized.

Data sample streams aligned via the above technique may be further processed in various ways in back-end system 4, e.g. by averaging, interpolating or otherwise combining data samples in some way to improve decoding accuracy and enhance sensitivity. In preferred embodiments, SDR processing system 4 is further operable to calculate the time-difference-of-arrival (TDOA) of a data signal at different receivers. The concept of TDOA is well known and described in literature, and can be used for device localization whereby the unknown position of a data transmitting device 5 can be determined with respect to a coordinate system. Localization can be based on well-established multilateration techniques. Accurate time information is crucial to these localization systems. Typically, the localization accuracy of a given system depends on the clock synchronization of receivers or data transmitters. For example, in the case of the well-known global positioning system (GPS), atomic clocks are used to keep the satellites time synchronized. In this case the localization computation is executed on a GPS receiver, which determines its own position with respect to the Earth coordinate system, based on the known positions of the satellites.

The operation of SDR processing system 4 for TDOA calculation in a first embodiment will be described with reference to FIGS. 6 and 7.

Figure 6:
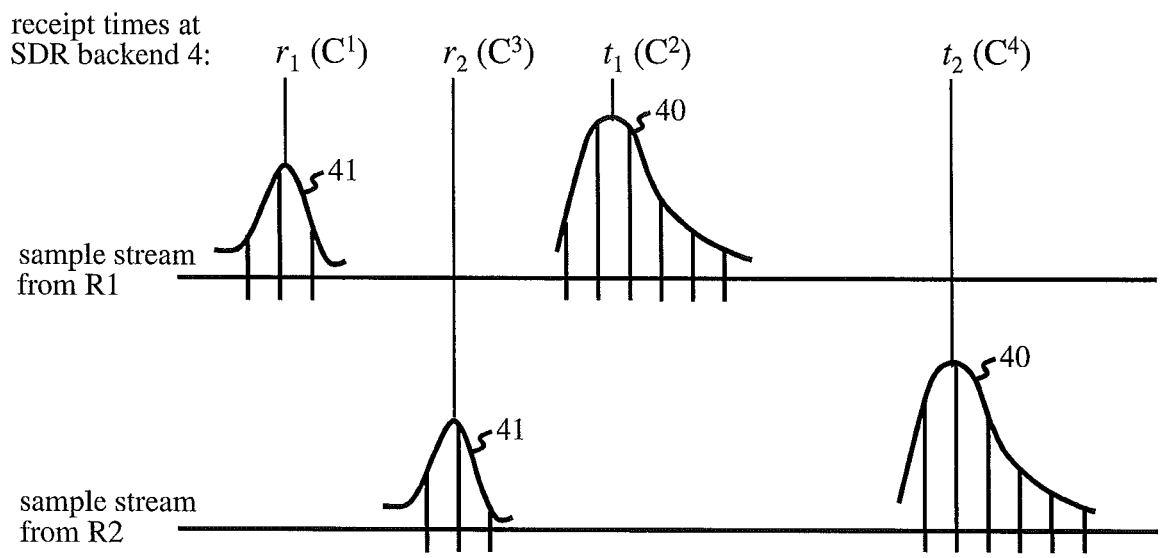
FIG. 6 is a schematic timing diagram for sample streams from different receivers at the data processing system.
Figures 7, 8, 9:
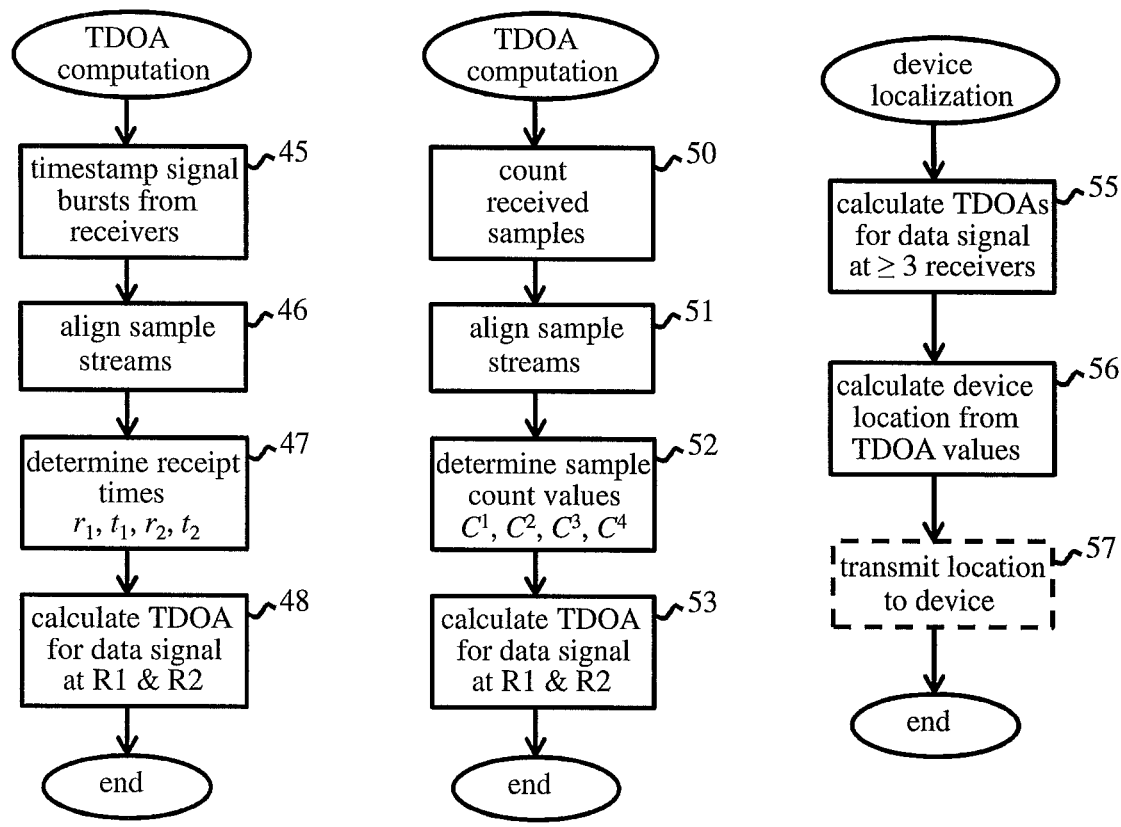
FIG. 7 indicates steps performed by the data processing system for calculating time-difference-of-arrival for data signals in one embodiment.
FIG. 8 indicates steps performed by the data processing system for calculating time-difference-of-arrival in another embodiment.
FIG. 9 indicates steps performed by the data processing system for calculating location of a data signal transmitter.

FIG. 6 is a schematic timing diagram indicating sample streams from different receivers 2, here R1 and R2, received via network 3 by SDR processing system 4. Each sample stream contains a data signal 40 from a transmitting device 5, and a sync pulse 41 from a known receiver 2. The steps involved in TDOA computation at SDR processing system 4 are indicated in FIG. 7. For this computation, as indicated at step 45, the processing system 4 timestamps the raw signal bursts from receivers 2 as they arrive at the processing infrastructure. Hence, SDR processing system 4 timestamps successive bursts of each sample stream on receipt from network 3. In a distributed processing system 4 such as a cloud-based system where several compute cores (nodes) are employed for SDR processing, accurate time synchronization between compute cores is provided in known manner. (Such time synchronization is commonly available in data centers. For example, protocols such as PTP (Precision Time Protocol) can provide nanosecond accuracy for synchronization of distributed clocks.) In step 46, alignment of data streams to counteract the sampling clock offset is performed as described above. In step 47, processing system 4 determines from the timestamps respective receipt times at system 4 for the data signal 40 and sync signal 41 in each of the sample streams from R1 and R2. These receipt times are indicated by times $r_1$, $t_1$ and $r_2$, $t_2$ in FIG. 6 and are relative to the processing system infrastructure. (The notation shown in brackets after times $r_1$, $t_1$, $r_2$, $t_2$ here relates to an alternative embodiment described below). The receipt times $r_1$, $t_1$ thus include a network delay, denoted by N1 in the following, for transport of samples from R1 over network 3 to SDR processing system 4. Similarity, receipt times $r_2$, $t_2$ include a network delay N2 for transport of samples from R2 to processing system 4. The network delays N1 and N2 are assumed to be constant for the short time window of the analysis. (This is a fair assumption even with current Ethernet technology, and in practice the delays need be constant only for short, e.g. up to 10-second, time windows). The difference dN=N1−N2 in the two network delays is therefore constant for the short time window of the analysis. Next, in step 48, processing system 4 calculates from the receipt times $r_1$, $t_1$, $r_2$, $t_2$ a time-difference-of-arrival $TDOA_{1,2}$ of the data signal 40 at receivers R1 and R2. The value $TDOA_{1,2}$ can be calculated as follows.

Assuming c is the speed of light, we have the following relations:

$$r_2 = r_1 + dN + (d_2 - d_1)/c, \text{ and}$$

$$t_2 = t_1 + dN + TDOA_{1,2}.$$

where $d_1$ is the known distance between R1 and the receiver 2 which transmitted sync pulse 41, and $d_2$ is the known distance between R2 and that receiver. Hence, irrespective of time at the processing system infrastructure, the difference dN between the network delays cancels out via:

$$\begin{aligned}TDOA_{1,2} &= (t_2 - t_1) - dN \\ &= (t_2 - t_1) - (r_2 - r_1) + (d_2 - d_1)/c,\end{aligned} \quad \text{Equation (1)}$$

and hence:

$$TDOA_{1,2} = (t_2 - r_2 + d_2/c) - (t_1 - r_1 + d_1/c)$$

The terms $r_1$, $r_2$, $d_1/c$, $d_2/c$ can be viewed as corrections factors which account for the fact that the receivers are not synchronized with the back-end SDR processing.

An alternative preferred embodiment for TDOA calculation will be described below with reference to FIG. 8. This embodiment can be understood by considering Equation (1) in the form:

$$TDOA_{1,2} = (t_2 - r_2) - (t_1 - r_1) - (d_1 - d_2)/c \quad \text{Equation (2)}$$

Referring again to FIG. 6, the time difference $(t_1 - r_1)$ here depends on the number of samples received from R1 in this period and the sampling period (i.e. inverse of the sampling rate) at receiver R1. This sampling period, measured in seconds, is denoted by $S_1$ in the following. Similarly, the time difference $(t_2 - r_2)$ depends on the number of samples received from R2 in this period and the sampling period, denoted by $S_2$, at receiver R2. The sampling periods $S_1$, $S_2$, etc., of different receivers 2 are known to processing system 4 in this embodiment. Instead of using timestamps, sample counters are provided at receiving nodes of processing system 4. In particular, as indicated at step 50 of FIG. 8, the receiving node for a data stream (from R1 or R2 in the FIG. 6 example) counts samples of the received data stream to provide sample counts $C_s$ for respective samples. In step 51, alignment of the data streams from R1 and R2 is performed as previously described. In step 52, processing system 4 determines from the sample counts $C_s$ respective sample count values corresponding to receipt of the sync signal 41 and data signal 40 in each of the sample streams from R1 and R2. These sample count values are indicated by $C^1$, $C^2$, $C^3$ and $C^4$ in FIG. 6 and may comprise fractional values following the alignment process. These count values are independent of network delays and time at the processing system infrastructure. Next, in step 53, processing system 4 calculates from the sample count values $C^1$, $C^2$, $C^3$, $C^4$ a time-difference-of-arrival $TDOA_{1,2}$ of the data signal 40 at receivers R1 and R2. Referring to Equation 2 above, the value $TDOA_{1,2}$ can be calculated here as:

$$TDOA_{1,2} = S_2(C^4 - C^3) - S_1(C^2 - C^1) - (d_1 - d_2)/c \qquad \text{Equation (3)}$$

The above techniques allow TDOA calculation for a data signal at a given pair of receivers 2. Where the data signal is also received by further receivers, the TDOA values for a plurality of pairs of receivers can be used to calculate location of the data transmitter device using standard TDOA techniques. Steps performed by SDR processing system 4 for device location are indicated in FIG. 9. In step 55 of this process, processing system 4 calculates TDOA values as described above for receipt of the data signal at a plurality of pairs of receivers 2. In particular, a device location can be obtained from the calculated TDOA values for a data signal for at least two pairs of different receivers. Three receivers which are linearly independent (not all linearly aligned), giving TDOA values from at least two pairs of the three, are required are to obtain a 2-dimensional device location. Four receivers (giving TDOA values from at least three linearly independent pairs of the four) are required to obtain a 3-dimensional device location. Additional TDOA values, e.g. obtained from all receivers in the array, can be used to improve location accuracy in each case. In step 56, processing system 4 uses the TDOA values from step 55 to calculate location of the data transmitter 5 using known lateration techniques as mentioned above. In optional step 57, if the device 5 needs to know its own position, the calculated location can be communicated back to the device through transmission via the array of receivers 2.

The above embodiments permit localization of devices entirely in SDR back-end system 4, without relying on the underlying infrastructure. Neither receivers 2 nor data transmitters 5 are required to be time-synchronized, and no specialized network hardware with transport time information is required. Devices 5 send data as part of their normal communication, and their position is calculated in the back-end using the raw I/Q signal information from the SDR system receivers.

It will be seen that the foregoing embodiments allow synchronization of radio signals in SDR systems using general-purpose hardware such as general-purpose network links and computation nodes. Radio receivers and transport networks do not require costly time synchronization techniques, allowing all the computation to be performed in the back-end system, independent of the time at the radio receivers. Furthermore, no power hungry computations or radio decoding is required at transmitting devices 5. Energy is only spent on sending out data, no extra energy being required on the device side for reception or time synchronization. Accuracy of the system operations described depends on factors such as the sampling rate of the RF receivers 2, the bandwidth used for data communications and synchronization signals, the frequency with which synchronization pulses are sent and detected, and choice of synchronization pulse waveforms. These can be tailored as desired for a given application.

It will of course be appreciated that many changes and modifications can be made to the exemplary embodiments described. By way of example, embodiments can be envisaged where the formulae given above for TDOA calculation are refined by addition of further terms. For instance, in systems where clock drift between sync pulses is modelled in back-end system 4, correction terms to account for this may be included in the TDOA formulae. Other correction terms may be based on modelling of drift in receiver clocks where appropriate. As a further example, in other embodiments the sync signal generation could be performed in processing system 4 instead of local signal generators 12 at receivers. In this case, processing system 4 may supply a sync signal to a receiver 2 in the form of I/Q samples for transmission. The scheduling of sync signals can then be controlled directly by processing system 4.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A software-defined radio system comprising:
   a plurality of fixed radio receivers each operable to receive radio signals in a receiving band, to sample a received radio signal to produce a sample stream, and to send the sample stream over a network;
   at least one fixed sync signal transmitter operable to transmit predetermined sync signals in said receiving band to receivers of said plurality; and
   a data processing system connected to said network for receiving sample streams from the receivers, the data processing system being operable to align samples of a data signal contained in sample streams from different receivers by detecting one of said predetermined sync signals in those sample streams, determining a timing offset between samples of the sync signal in those sample streams, said timing offset determined based on predetermined locations of said different receivers and a location of the transmitter of that sync signal, and aligning said samples of the data signal in dependence on said timing offset, said data processing system being operable to:
   count samples of each said sample stream to provide sample counts for respective samples;
   determine from the sample counts respective sample count values corresponding to receipt of said data signal and said sync signal in each of said sample streams from different receivers; and
   calculate from said sample count values a time-difference-of-arrival of said data signal at at least one pair of said different receivers.

2. The radio system as claimed in claim 1 including a plurality of said sync signal transmitters, a respective sync signal transmitter of said plurality provided at a respective said receiver each provided by a said receiver.

3. The radio system as claimed in claim 2 wherein each said receiver includes a sync signal transmitter.

4. The radio system as claimed in claim 3 wherein the sync signal transmitters of different receivers are adapted to transmit different sync signals.

5. The radio system as claimed in claim 3 wherein the sync signal transmitters are selectively operable to transmit sync signals in accordance with a predetermined schedule.

6. The radio system as claimed in claim 1 wherein said time-difference-of-arrival is calculated as $$TDOA=(t_2-r_2+d_2/c)-(t-r_1+d_1/c)$$

where:
TDOA is the time-difference-of-arrival;
$t_1$ and $t_2$ are said respective receipt times for said data signal in the sample streams from first and second receivers of said pair;
$r_1$ and $r_2$ are said respective receipt times for said sync signal the sample streams from the first and second receivers;
$d_1$ is the distance of the first receiver from the transmitter of that sync signal;
$d_2$ is the distance of the second receiver from the transmitter of that sync signal; and
c is the speed of light.

7. The radio system as claimed in claim 1 wherein said data processing system is further operable to calculate a location of a transmitter of said data signal from the calculated time-differences-of-arrival of that data signal for at least two pairs of said different receivers.

8. The radio system as claimed in claim 1 wherein said time-difference-of-arrival is calculated as $$TDOA_{1,2}=S_2(C^4-C^3)-S_1(C^2-C^1)-(d_1-d_2)/C$$

where:
TDOA is the time-difference-of-arrival;
$C^2$ and $C^4$ are said sample count values corresponding to said data signal in the sample streams from first and second receivers of said pair;
$C^1$ and $C^3$ are said sample count values corresponding to said sync signal the sample streams from the first and second receivers;
$S_1$ and $S_2$ are respective sampling periods of the first and second receivers;
$d_1$ is the distance of the first receiver from the transmitter of that sync signal;
$d_2$ is the distance of the second receiver from the transmitter of that sync signal; and
c is the speed of light.

9. The radio system as claimed in claim 1 wherein said data processing system is further operable to calculate a location of a transmitter of said data signal from the calculated time-differences-of-arrival of that data signal for at least two pairs of said different receivers.

10. The radio system as claimed in claim 1 wherein said data processing system comprises a cloud computing system.

11. A method for processing samples of a data signal contained in sample streams received by a data processing system, via a network, from different radio receivers of a plurality of fixed radio receivers each operable to receive radio signals in a receiving band, to sample a received radio signal to produce a sample stream, and to send the sample stream to the data processing system via the network, said sample streams containing samples of a predetermined sync signal received by said different receivers from a fixed sync signal transmitter, wherein the method comprises, at the data processing system:
  detecting said sync signal in the sample streams;
  determining a timing offset between samples of the sync signal in the sample streams from said different receivers, said timing offset determined based on predetermined locations of said different receivers and a location of said sync signal transmitter; and
  aligning said samples of the data signal in the sample streams from said different receivers in dependence on said timing offset, said data processing system further:
  counting samples of each said sample stream to provide sample counts for respective samples;
  determining from the sample counts respective sample count values corresponding to receipt of said data signal and said sync signal in each of said sample streams from different receivers; and
  calculating from said sample count values a time-difference-of-arrival of said data signal at at least one pair of said different receivers.

12. A method as claimed in claim 11 including, at the data processing system, calculating said time-difference-of-arrival as $$TDOA=(t_2-r_2+d_2/c)-(t_1-r_1+d_1/c)$$

where:
TDOA is the time-difference-of-arrival;
$t_1$ and $t_2$ are said respective receipt times for said data signal in the sample streams from first and second receivers of said pair;
$r_1$ and $r_2$ are said respective receipt times for said sync signal the sample streams from the first and second receivers;
$d_1$ is the distance of the first receiver from the sync signal transmitter;
$d_2$ is the distance of the second receiver from the sync signal transmitter; and
c is the speed of light.

13. The method as claimed in claim 11 including, at the data processing system, calculating said time-difference-of-arrival as $$TDOA_{1,2}=S_2(C^4-C^3)-S_1(C^2-C^1)-(d_1-d_2)/c$$

where:
TDOA is the time-difference-of-arrival;
$C^2$ and $C^4$ are said sample count values corresponding to said data signal in the sample streams from first and second receivers of said pair;
$C^1$ and $C^3$ are said sample count values corresponding to said sync signal the sample streams from the first and second receivers;
$S_1$ and $S_2$ are respective sampling periods of the first and second receivers;
$d_1$ is the distance of the first receiver from the transmitter of that sync signal;
$d_2$ is the distance of the second receiver from the transmitter of that sync signal; and
c is the speed of light.

14. A computer program product for processing samples of a data signal contained in sample streams received by a data processing system, via a network, from different radio receivers of a plurality of fixed radio receivers each operable to receive radio signals in a receiving band, to sample a received radio signal to produce a sample stream, and to send the sample stream to the data processing system via the network, said sample streams containing samples of a predetermined sync signal received by said different receivers from a fixed sync signal transmitter, said computer program product comprising a non-transitory computer readable storage medium having embodied therein:

first program instructions executable by a computer of the data processing system to cause the computer to detect said sync signal in the sample streams;

second program instructions executable by the computer of the data processing system to cause the computer to determine a timing offset between samples of the sync signal in the sample streams from said different receivers, said timing offset determined based on predetermined locations of said different receivers and a location of said sync signal transmitter;

third program instructions executable by the computer of the data processing system to cause the computer to align said samples of the data signal in the sample streams from said different receivers in dependence on said timing offset:

fourth program instructions executable by the computer of the data processing system to cause the computer to count samples of each said sample stream to provide sample counts for respective samples;

fifth program instructions executable by the computer of the data processing system to cause the computer to determine from the sample counts respective sample count values corresponding to receipt of said data signal and said sync signal in each of said sample streams from different receivers; and sixth program instructions executable by the computer of the data processing system to cause the computer to calculate from said sample count values a time-difference-of-arrival of said data signal at at least one pair of said different receivers.

\* \* \* \* \*